BEST AVAILABLE COPY
Jan. 1, 1935.     E. KIRKPATRICK     1,986,402
FAUCET
Filed March 6, 1933
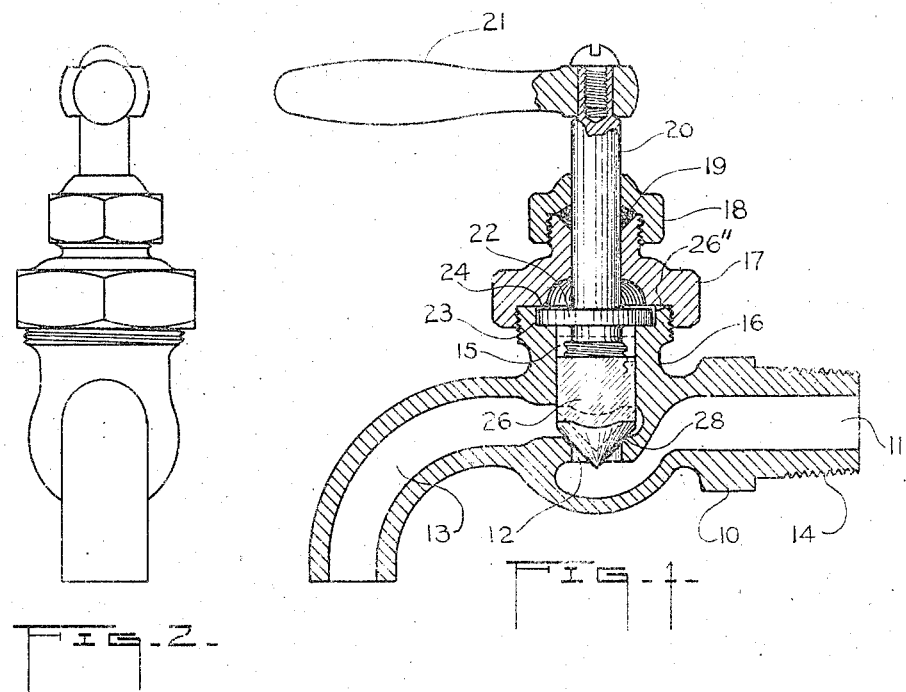
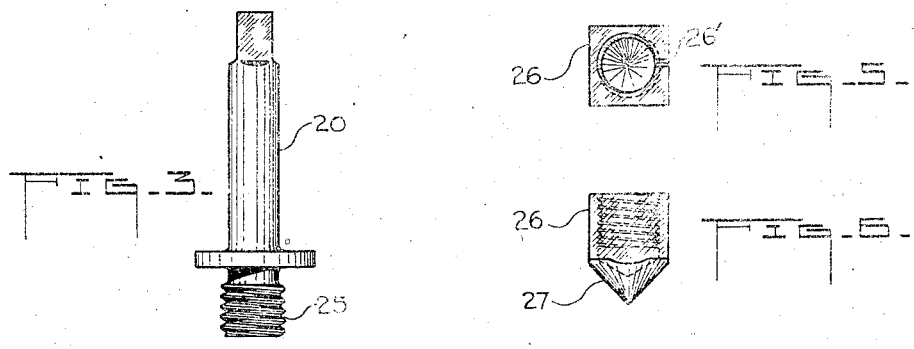
INVENTOR
Edward Kirkpatrick
PER
Tefft & Tefft
ATTY'S.

Patented Jan. 1, 1935

1,986,402

UNITED STATES PATENT OFFICE 1,986,402

FAUCET

Edward Kirkpatrick, Peoria, Ill.

Application March 6, 1933, Serial No. 659,757

1 Claim. (Cl. 251—48)

This invention relates to faucets or valves commonly used for control of flow of liquids, and has for one of its objects the provision of valve means in which the movable portion of the valve is non-rotatable with relation to its seat.

Another object is to provide a valve member having squared body portion adapted to slide within a squared opening in the valve body portion.

A further object is to provide a squared valve member having a threaded recess adapted to receive a complementally threaded portion of a stem in such a manner that rotation of the stem will result in corresponding longitudinal movement of the squared valve member to open and close the valve.

Other objects will appear in the following description and drawing, in which—

Fig. 1 is a cross-sectional side elevational view showing the valve mechanism to be described;

Fig. 2 is an end elevational perspective view of a faucet such as that shown in Fig. 1;

Fig. 3 is a perspective view of the valve stem member to be described;

Fig. 4 is an end view of the same;

Fig. 5 is a top or plan view of the movable valve member to be described, and

Fig. 6 is a side elevational view of the same.

Referring to the drawing, Fig. 1 discloses a faucet of conventional form, having a body portion 10 within which is formed a continuing passage comprising an inlet portion 11 and an orifice 12 leading to an outlet portion 13.

Means for attachment of the faucet with external conductor pipe is provided by a threaded portion 14 of the body 10.

Formed in the body 10 and disposed above orifice 12 is a squared opening 15, the upper portion of the same being surrounded by a boss portion 16.

About the upper exterior of boss 16 is a threaded portion adapted to receive a complementally threaded cap member 17, the upper portion of which is threaded to receive a packing nut 18. The inner opposing surfaces of cap 17 and packing nut 18 are so formed as to retain suitable compressible packing material 19 in such a manner that when nut 18 is screwed down upon cap 17, the packing material is compressed about a stem member 20 to form a fluid tight joint.

The stem 20 has secured to its upper extremity a handle 21 whereby it is manually rotated to open and close the valve.

The stem is rotatably supported in the faucet structure by means of its disposal in central openings in nut 18 and cap 17 and is suitably retained therein by means of a flange portion 22 rotatably retained in a recess portion 23 of body 10.

The depth of recess 23 is so proportioned with relation to the thickness of flange 22 that the shoulder portion 24 of cap 17 when screwed down tightly against the upper surface of boss portion 16, does not quite touch the flange 22. Thus, the flange is rotatably retained in recess 23.

As best shown in Fig. 3, the lower end of stem 20 is provided with a thread 25 preferably of left hand progression, which is adapted to be received within a threaded portion of a valve member 26, which is best shown in Figs. 5 and 6.

Fig. 5 illustrates that member 26 has a square body form, while Fig. 6 indicates that the lower extremity 27 has a conical form.

Reference to Figs. 1 and 5 will indicate, as in Fig. 5, that a diminutive slot 26' is formed in the upper face of member 26, and, as in Fig. 1, a similar slot 26'' is formed in the upper surface surrounding the recess 23.

Reference to Fig. 1 will indicate that the squared body portion of member 26 is slidably mounted within the squared opening 15 of body 10, and that the conical portion 27 is adapted to seat upon a complementally formed upper rim portion of orifice 12, designated 28, in such a manner as to stop the orifice and thereby separate the passages 11 and 13.

Manual operation of the valve is accomplished by means of the handle 21 which may be manipulated to rotate stem 20 to advance or withdraw the screw portion 25 into or out of the valve portion 26.

The slots 26' and 26'' are adapted to act as indexing marks whereby member 26 may be removed from the valve body and replaced therein in original arrangement.

Since the stem is retained against longitudinal movement by the flange 22, as retained in recess 23, it is clear that rotation of the stem will result in movement of valve portion 26 within opening 15 to open or close the valve.

While the invention is herein shown as embodied in a conventional faucet, it is to be understood that it is applicable to any form or size of valve and therefore I do not intend that application of the invention shall be limited to any particular form.

What I claim is:

In a valve, the combination of a body portion having two ducts therein, the inner ends of said ducts being disposed one above the other, a separating wall between said ducts having a passage therethrough connecting said ducts, said passage being of frusto-conical shape and forming a valve seat, a chamber of polygonal cross section above said passage and in axial alignment therewith, the walls of said chamber being integral with said body portion, a shoulder integral with said body portion around the upper edges of the walls of said chamber, a valve member vertically slidably mounted in said chamber, said valve member having a polygonal shape corresponding to the shape of said chamber and fitting tightly therein, a conical portion at the lower end of said valve member, adapted to fit into said valve seat and close the same, the upper end of said valve member being internally threaded, a valve stem having an externally threaded portion at its lower end engaging with the internally threaded portion of said valve member, a flanged portion on said valve stem above said shoulder, a bearing member centrally arranged above said valve member having an internally threaded flange downwardly extending therefrom, said body portion having an externally threaded portion adjacent said shoulder, said flange threadedly engaging with said threaded portion of the body portion and having an internal shoulder integral therewith, said shoulder overlying and adapted to engage said flange to prevent the upward movement of said valve stem, said bearing member surrounding and guiding said valve stem, a packing chamber at the upper end of said bearing member, compressible packing material surrounding said valve stem within said packing chamber, a packing nut threadedly engaging said bearing member for compressing said packing material and sealing said valve stem, and a handle at the upper end of said valve stem rigidly secured thereto for rotating said valve stem and for lifting or lowering said valve member with respect to said valve seat.

EDWARD KIRKPATRICK.